(12) United States Patent
Brehmer et al.

(10) Patent No.: US 7,397,505 B2
(45) Date of Patent: Jul. 8, 2008

(54) CMOS SENSOR WITH OVER-SATURATION ABATEMENT

(75) Inventors: Kevin E. Brehmer, Morgan Hill, CA (US); Brannon Harris, Los Gatos, CA (US)

(73) Assignee: Zoran Corporation, Sunnyvale, CA (US)

(*) Notice: Subject to any disclaimer, the term of this patent is extended or adjusted under 35 U.S.C. 154(b) by 588 days.

(21) Appl. No.: 10/053,111

(22) Filed: Jan. 17, 2002

(65) Prior Publication Data
US 2003/0133627 A1   Jul. 17, 2003

(51) Int. Cl.
*H04N 9/64*  (2006.01)
*H04N 5/20*  (2006.01)
*H04N 3/14*  (2006.01)

(52) U.S. Cl. .................. 348/243; 348/251; 348/301; 348/308

(58) Field of Classification Search .............. 348/241, 348/243, 301–302, 307–310
See application file for complete search history.

(56) References Cited

U.S. PATENT DOCUMENTS

| | | | | | |
|---|---|---|---|---|---|
| 5,786,713 | A | * | 7/1998 | Koyama et al. | 327/108 |
| 5,841,126 | A | * | 11/1998 | Fossum et al. | 348/308 |
| 5,898,168 | A | | 4/1999 | Gowda et al. | |
| 5,900,623 | A | * | 5/1999 | Tsang et al. | 348/308 |
| 5,969,758 | A | * | 10/1999 | Sauer et al. | 348/241 |
| 6,046,640 | A | | 4/2000 | Brunner | |
| 6,115,066 | A | | 9/2000 | Gowda et al. | |
| 6,157,407 | A | * | 12/2000 | Kobayashi | 348/241 |
| 6,704,050 | B1 | * | 3/2004 | Washkurak et al. | 348/302 |
| 6,900,832 | B1 | * | 5/2005 | Yano | 348/220.1 |
| 7,081,921 | B2 | * | 7/2006 | Nitta et al. | 348/229.1 |

* cited by examiner

*Primary Examiner*—Ngoc-Yen T. Vu
*Assistant Examiner*—Carramah J Quiett
(74) *Attorney, Agent, or Firm*—Davis Wright Tremaine LLP

(57) ABSTRACT

A method and apparatus are described that detect and correct for over-saturation lighting conditions in a CMOS Image Sensor.

8 Claims, 14 Drawing Sheets

CMOS SENSOR WITH OVER-SATURATION ABATEMENT

FIELD OF THE INVENTION

This invention generally relates to light sensing circuitry. The invention more specifically relates to circuits for CMOS based image-sensing circuits such as may typically be found in digital electronic cameras.

BACKGROUND OF THE INVENTION

Electronic digital cameras are superseding traditional cameras which rely upon chemical processing. As with other consumer oriented electronic products there is great pressure to reduce costs. There is also the need for low cost solid state image sensors to complement computers and communication devices and for practicable video conferencing and so on. The image input device is central to such applications. CMOS image sensors have proven themselves to be superior image input devices for low power mobile operations. CMOS image sensors may also have other applications. An important advantage of CMOS image sensors (or imagers) is that imager and signal processing circuits can easily be integrated on a single semiconductor chip. This brings into prospect single-chip camera systems. Charge coupled devices (CCDs) are used as an alternative to CMOS imagers, however, the latter may be cheaper to fabricate for a given level of performance and capacity. CMOS fabs such as may be used to build the invention are well known in the art. Typically, image sensors produce digitized raster-like arrays of electronic luminance signals corresponding to and responsive to the incident light that makes up an image.

The image sensor quality produced by CMOS image sensors has been improving in recent years to the point that CMOS image sensor performance begins to rival CCD image sensor performance. Thus, CMOS image sensors have begun to penetrate the DSC (digital still camera) marketplace. In order to ensure good image quality, CMOS image sensors may use CDS (correlated double sampling) circuits to remove FPN (fixed pattern noise). CDS is well known in the art. The use of CDS circuits has introduced a problem in that pictures of extremely bright lights or reflections from shiny surfaces may be imaged poorly. In these conditions, a spurious dark central area may appear in the middle of a very bright area. This phenomenon is sometimes termed image inversion. A method and image sensor with over-saturation detection and image inversion correction circuitry that solves the subject problem is described.

SUMMARY

According to an aspect of the invention, a method for image sensing is disclosed. The method may comprise producing, from a photo detector, a plurality of detected electronic signals; amplifying them, with a column buffer amplifier, to produce a plurality of amplified signals; sampling some of the amplified signals, with a correlated double sampler, and clamping signals in response to over-saturation conditions. Thus, image inversion is at least partially abated.

According to a further aspect of the invention, a method for enhancing a video image is disclosed. The method may comprise sampling image signals with a correlated double sampler and clamping signals during a reset phase of the correlated double sampler.

According to a further aspect of the invention, a circuit is disclosed. The circuit may comprise an image sensor array comprising a clamp circuit, a column buffer amplifier, and a correlated double sampling circuit.

According to a further aspect of the invention, a method for processing a signal is disclosed. The method may comprise producing a plurality of output luminance signals responsive to an incident light, generating a first sample of one of the luminance signals at a first time and a second sample of the respective luminance signal at a second time, producing a threshold passed signal output responsive to a condition of over-saturation by the incident light, and clamping the respective luminance signal sample during the first time responsive to the threshold passed signal.

According to a still further aspect of the invention, a circuit for providing a signal is disclosed. The circuit may include a plurality of pixel cells, a correlated double sampler, a threshold detection circuit having a threshold passed signal output responsive to a condition of one of the pixel cells of being over-saturated by the incident light; and a clamp circuit wherein the clamp circuit clamps a respective luminance signal.

According to a still further aspect of the invention, a circuit for providing a signal is disclosed. The circuit may include a means for producing a plurality of output luminance signals responsive to an incident light, a means for generating a first sample of one of the luminance signals at a first time and a second sample of the respective luminance signal at a second time, a means for producing a threshold passed signal output responsive to a condition of over-saturation by the incident light, and a means for clamping the respective luminance signal sample during the first time responsive to the threshold passed signal.

BRIEF DESCRIPTION OF THE DRAWINGS

For convenience in description, identical components have been given the same reference numbers in the various drawings.

DETAILED DESCRIPTION

Figure 1:
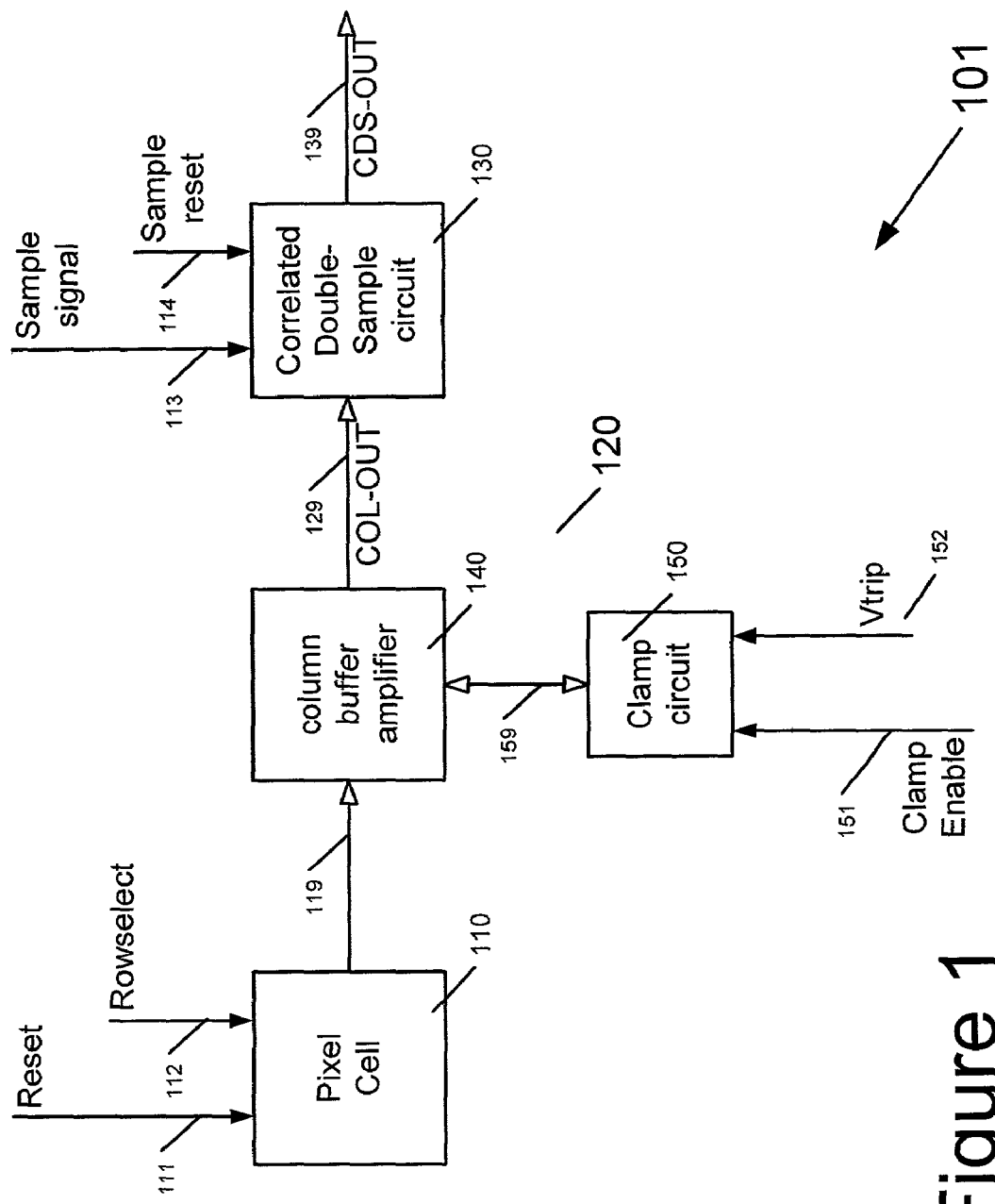
FIG. 1 is a block diagram of image sensor circuitry according to an embodiment of the invention.

In the following description, for purposes of clarity and conciseness of the description, not all of the numerous components shown in the schematic are described. The numerous components are shown in the drawings to provide a person of ordinary skill in the art a thorough enabling disclosure of the present invention. The operation of many of the components would be understood and apparent to one skilled in the art.

FIG. 1 is a block diagram of image sensor circuitry 101 according to an embodiment of the invention. The image sensor circuitry 101 could be used to produce still video images or moving video images such as motion pictures. Pixel cell circuit 110 provides a pixel signal 119 to per-column circuit 120. In one embodiment, pixel cell circuit receives optical input (not shown) and produces pixel signal 119 in response to the optical input, a reset signal 111 and a rowselect signal 112. Pixel signal 119 may be comprised of multiple signals conveyed by multiple conductors within the general scope of the invention. Column-buffer amplifier 140 produces output COL-OUT signal 129 and exchanges a signal 159 with clamp circuit 150. CDS circuit 130 performs correlated doubling sampling to produce an output signal CDS-OUT 139 in response to COL-OUT signal 129, Sample signal 113 and Sample reset 114. In this embodiment, per-column circuit 120 includes column-buffer amplifier 140 and clamp circuit 150.

Still referring to FIG. 1, an complete image sensor may be embodied using a large number of pixel cells arranged in a matrix having rows and columns. The rows and columns typically map onto horizontal and vertical directions, or vice versa, in the picture being imaged. Thus pixel cells are embodied as many instances and the cost per pixel cell must be held down. As the name suggests, the per-column circuit may be embodied on the basis of one instance of this circuit per column of pixel cells. In alternative designs there may be a small number, rather than one per-column circuit per column of pixel cells. The clamp circuit 150 and the CDS circuit 130 are each associated one to one with a per-column circuit 120, hence they are all three equal in number in a typical embodiment.

Figure 2:
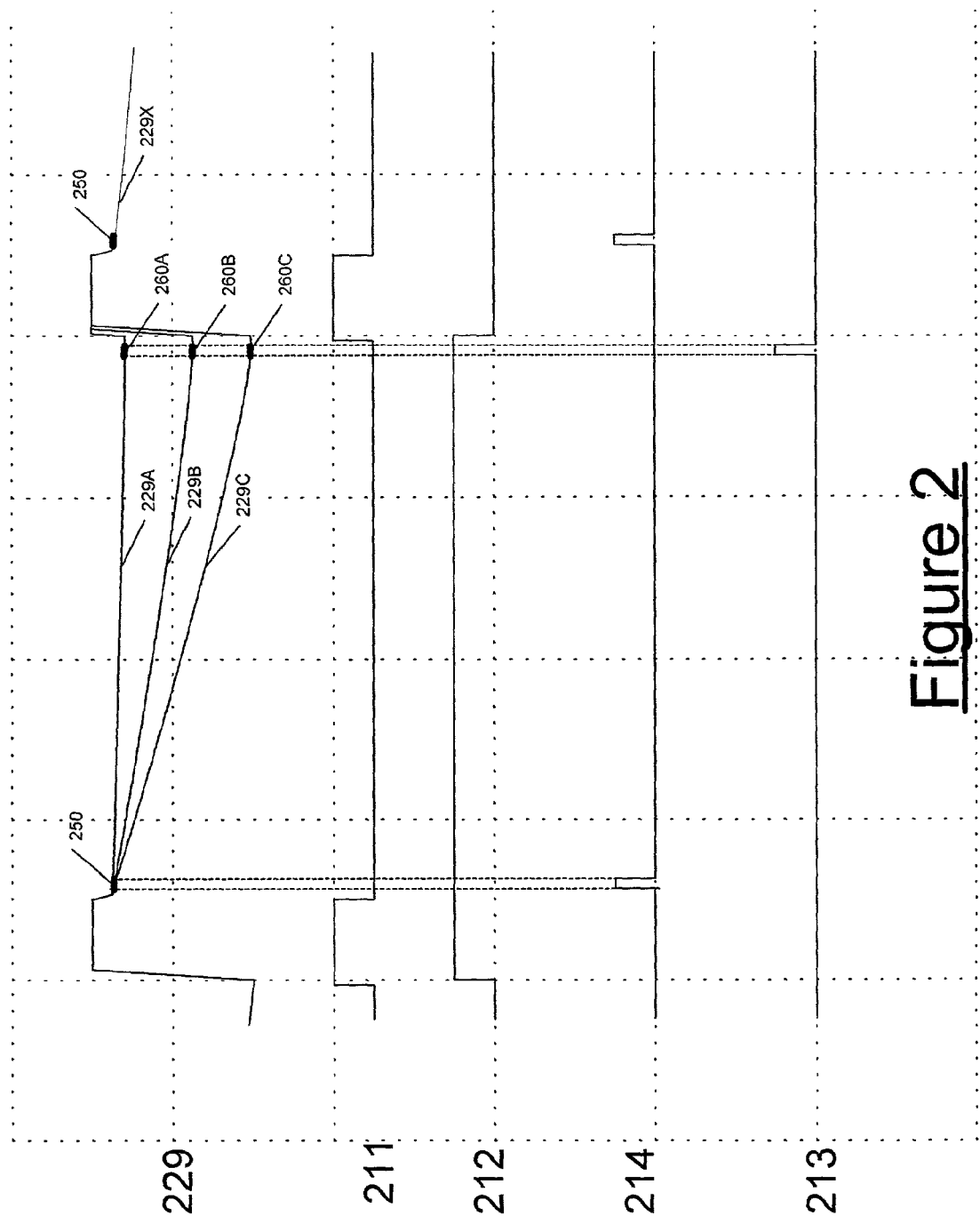
FIG. 2 shows temporal waveforms of some signals according to an embodiment of the invention.

FIG. 2 shows temporal waveforms of some signals according to an embodiment of the invention. Trace 229 represents the COL-OUT signal 129. Three possible waveforms are shown, 229A, 229B and 229C, corresponding to incident light conditions of dark, moderate, and saturated (but not over-saturated). Saturated light conditions occur when the incident light is just so bright that the corresponding waveform trace reaches the end of its range. Over-saturated light conditions are conditions wherein the incident light is brighter than saturated conditions. Contrast may be lost or image inversion may occur when light conditions become over-saturated. Trace 211 represents the Reset Signal 111. The Reset Signal 111 is used to establish the black reference level for the picture. When Rowselect signal 212 goes active (high in this exemplary embodiment), COL-OUT 229 is pulled high. A little later, when Reset 211 is released, COLOUT 229 drops rapidly a fixed amount according to a charge injection phenomenon explained below. Thereafter, COL-OUT 229 falls relatively slowly along one of the exemplary lines 229A, 229B or 229C or some other intermediate line responsive to the incident light level. Then the cycle starts again.

Referring together to FIGS. 1 and 2, signal 212 represents the row select signal 112. Pixel cells are arranged in rows and columns and once per waveform cycle, a particular row of cells are activated with the row select signal 212. Thus only one active pixel cell is associated with each per-column circuit at any time. In FIG. 2, row select 212 is shown active during the complete waveform cycle shown but is inactive in the second cycle (which is shown only in part). Consequently the COL-OUT signal path 229X is due to another pixel cell and not the one for which the row select signal 212 is shown. Signal 214 represents the "Sample Reset" signal, this signal is used by the CDS circuit 130 to strobe in a COL-OUT signal 229 datum value 250. Signal 213 represents the "Sample signal" signal 113, this signal is used by the CDS circuit 130 to strobe in a COL-OUT signal 229 light dependent value, for example, 260A, 260B or 260C according to the light level. The CDS circuit differences the values 250 from 260A (or 260B or 260C or some intermediate value) to produce the CDS-OUT signal (not shown in FIG. 2).

Figure 3:
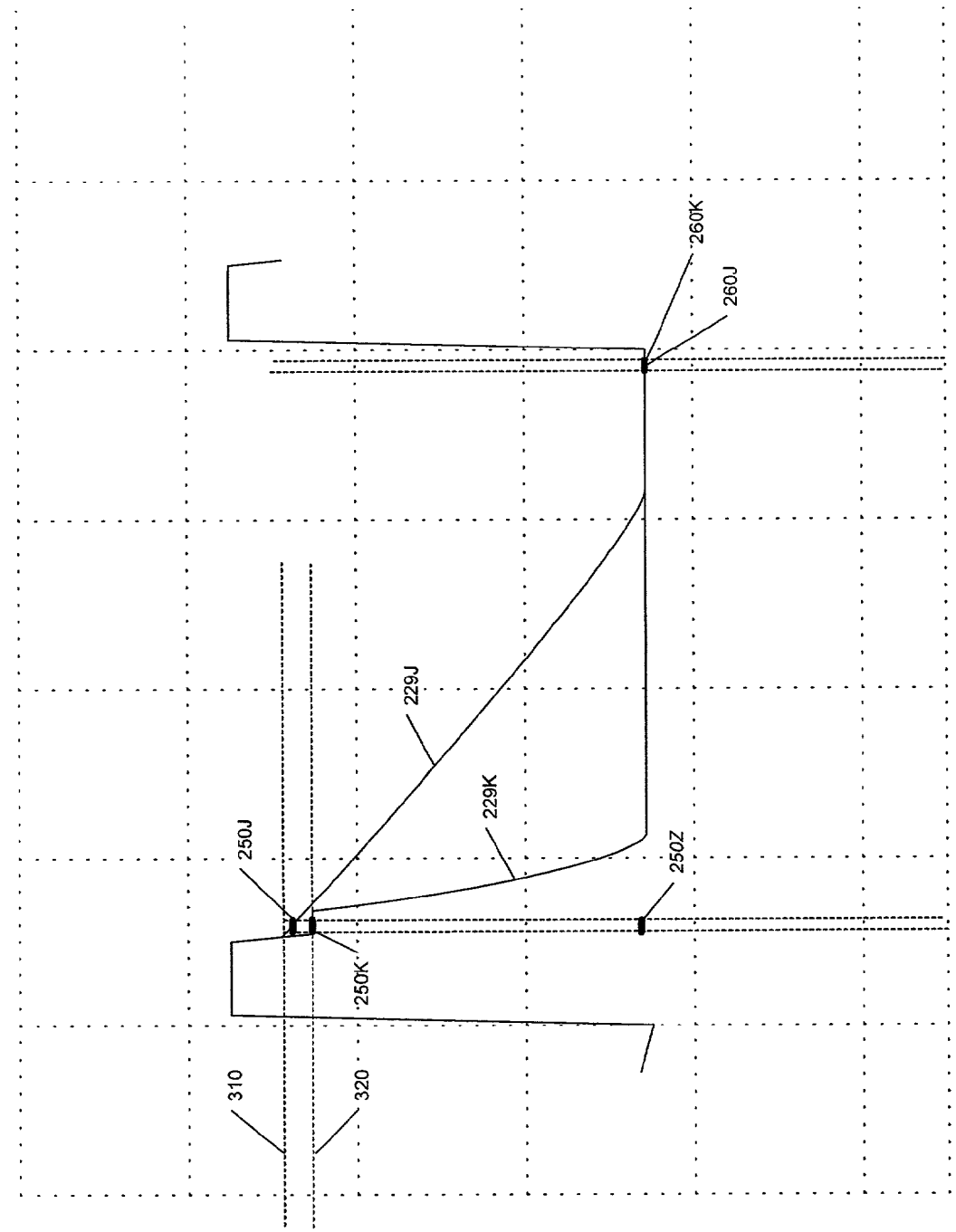
FIG. 3 shows further temporal waveforms of COL-OUT signals according to an embodiment of the invention.

FIG. 3 shows further temporal waveforms of COL-OUT signals 229J and 229K according to an embodiment of the invention. Referring together to FIGS. 1 and 3, trace 229J shows the COL-OUT signal for a slightly over-saturated pixel. The over-saturation causes the trace to stop falling as it reaches a limit prior to having a sample 260J taken in response to a "Sample signal" signal (not shown in FIG. 3). In the case of trace 229J, the reset datum sample 250J is formed in a manner similar to unsaturated conditions (as in FIG. 2) and the CDS circuit 130 will produce a valid value for the CDS-OUT signal.

Trace 229K represents a COL-OUT signal for an over-saturated pixel. After reset is released the curve falls rapidly to reference level 310 due to the action of charge injection as is explained below. Then the trace continues to fall rapidly due to the heavy over-saturation of the photo-sensitive detector. As the COL-OUT voltage passes threshold level 320, the clamp circuit 150 detects this condition and acts to pull the voltage high and hold it high until after the "Sample reset" datum sample 250K has been taken by the CDS circuit 130. Thereafter the curve falls rapidly resulting in a "Sample signal" value 260K at the same (saturated) level as sample 260J. The action of the clamp circuit prevents a bad "Sample reset" datum sample from being taken, such as the value shown as 250Z, which would result in an erroneous CDS-OUT value from the CDS circuit 130. This type of erroneous CDS-OUT may manifest itself as image inversion in a composed image. For example the sun may appear to have a dark disk at its center. A problem overcome by the invention is that in previously developed implementations, values for the datum sample may be unrepresentative of the reset level due to the signal falling too quickly, i.e., with excessive slewing. Other means of detecting the signal level slewing and falling too quickly are feasible within the general scope of the invention.

Figure 4:
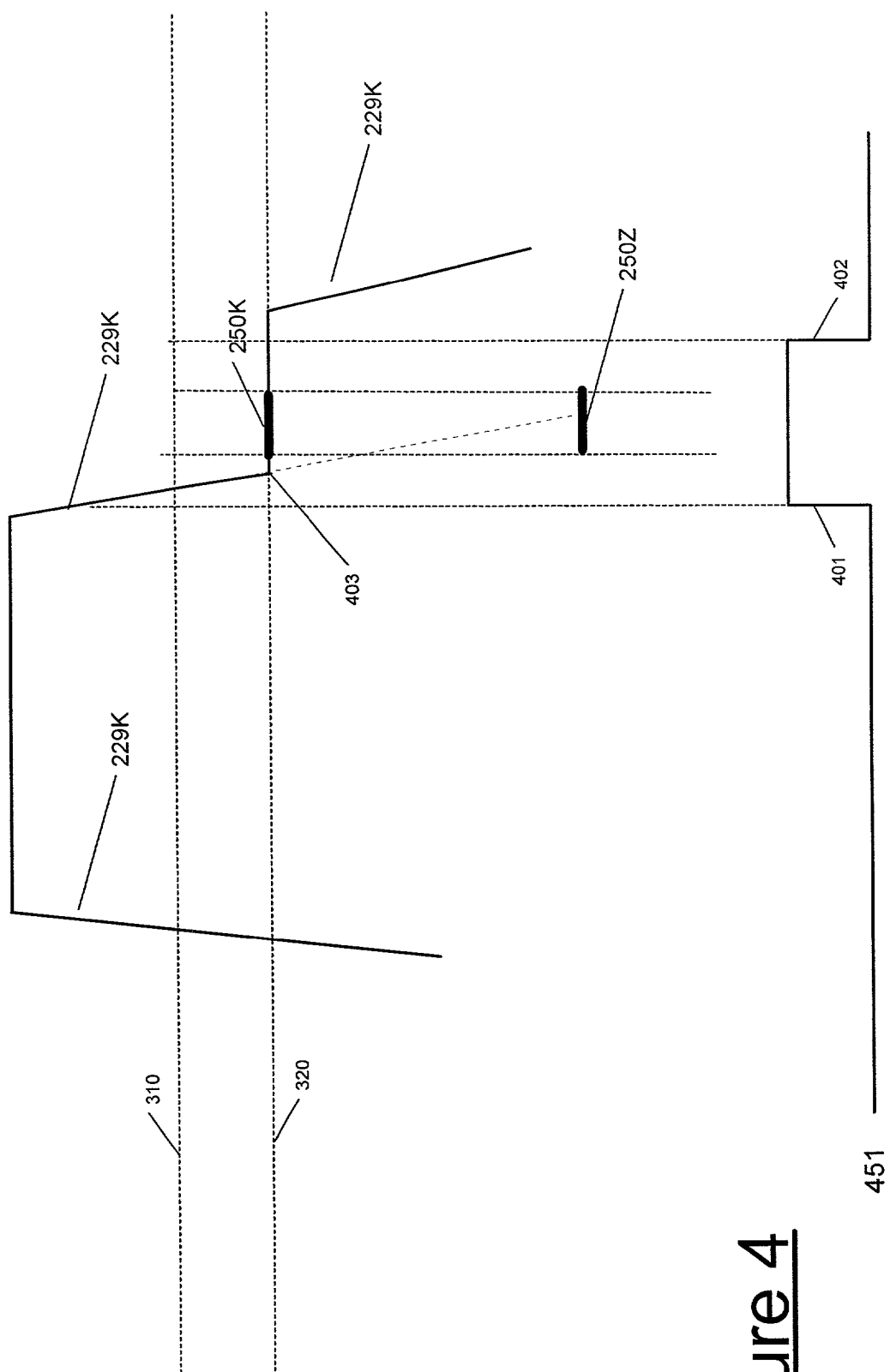
FIG. 4 shows more temporal waveforms according to an embodiment of the invention.

FIG. 4 shows more temporal waveforms according to an embodiment of the invention. Referring to both FIG. 1 and FIG. 4, trace 451 represent the Clamp Enable signal 151 (FIG. 1). Part of a COL-OUT signal trace is shown as 229K, the trace corresponding to a heavily over-saturated pixel condition. When the Clamp Enable 151 signal goes high (shown as 401), the clamp circuit begins to compare the COL-OUT signal 229K with the voltage level of the Vtrip 152 signal, shown as 320. When the COL-OUT signal 229K goes below the Vtrip level 320 (this point is shown as 403) and provided Clamp Enable 151 is asserted, the clamp circuit 150 clamps the COL-OUT signal 229 to the Vtrip level 320. This action enables a good measurement 250K to be taken by the CDS circuit 130 at the Vtrip level 320. For good performance the Vtrip level should be set as close as possible to the reference level without suffering false trips due to noise or other causes. When the Clamp Enable 151 signal is no longer asserted (shown as 402), then the clamp circuit 150 releases the COL- OUT signal 229K which then begin a rapid descent towards saturation. Thus, the clamp circuit 150 acts to prevent a bad measurement such as the hypothetical value 250Z.

Figure 5:
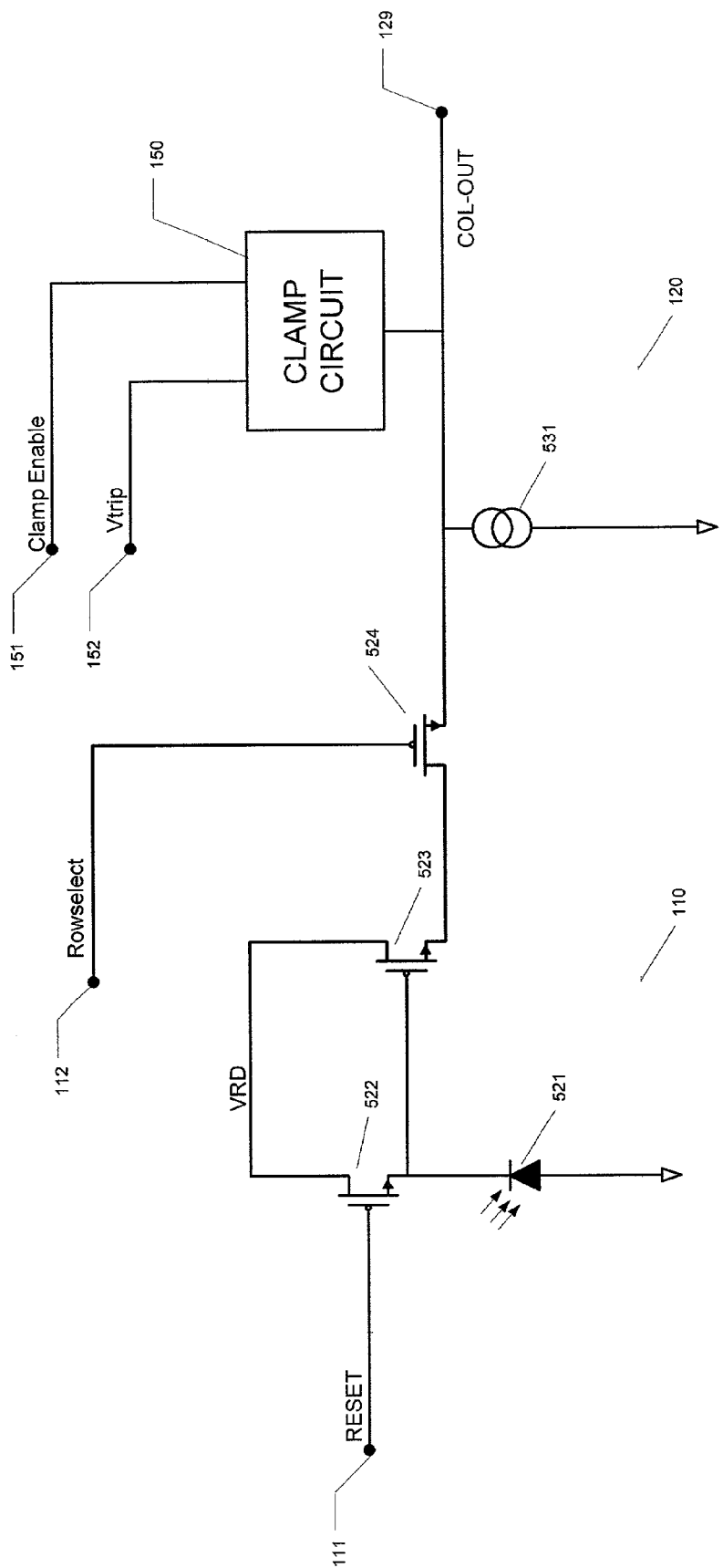
FIG. 5 shows in part schematic, part block diagram, pixel cell and per-column circuits according to an embodiment of the invention.

FIG. 5 shows in part schematic, part block diagram, exemplary pixel cell and per-column circuits according to an embodiment of the invention. Each pixel cell 110 may include a light sensitive photo detector 521 providing a photo-charge responsive to incident light. Photo detectors may be embodied in various ways such as photo diodes or photo gates. Each pixel cell 110 further may include a first, second, and third transistors 522, 523, and 524 to provide and output indicative of the intensity of the incident light. Operation of the exemplary pixel cell circuit 110 depicted in FIG. 5 is apparent to one of ordinary skill in the art.

Still referring to FIG. 5, the per-column circuit 120 may include a current source 531. In the absence of over-saturation conditions, the clamp circuit 150 has no effect upon the COL-OUT signal 129. In a strong over-saturation condition, a clamp circuit 150 will trip at the pre-determined threshold voltage Vtrip 152, during the clamp enabled period which is determined by the "Clamp Enable" signal 151. After clamp circuit 150 has tripped and while the "Clamp Enable" signal 151 remains asserted, the clamp circuit 150 acts to limit the COL-OUT signal voltage. Once the voltage level from the source of transistor 524 falls below the clamp circuit 150 trip voltage Vtrip 152, the clamp circuit 150 activates and limits the COL-OUT 129 signal voltage.

Figure 6:
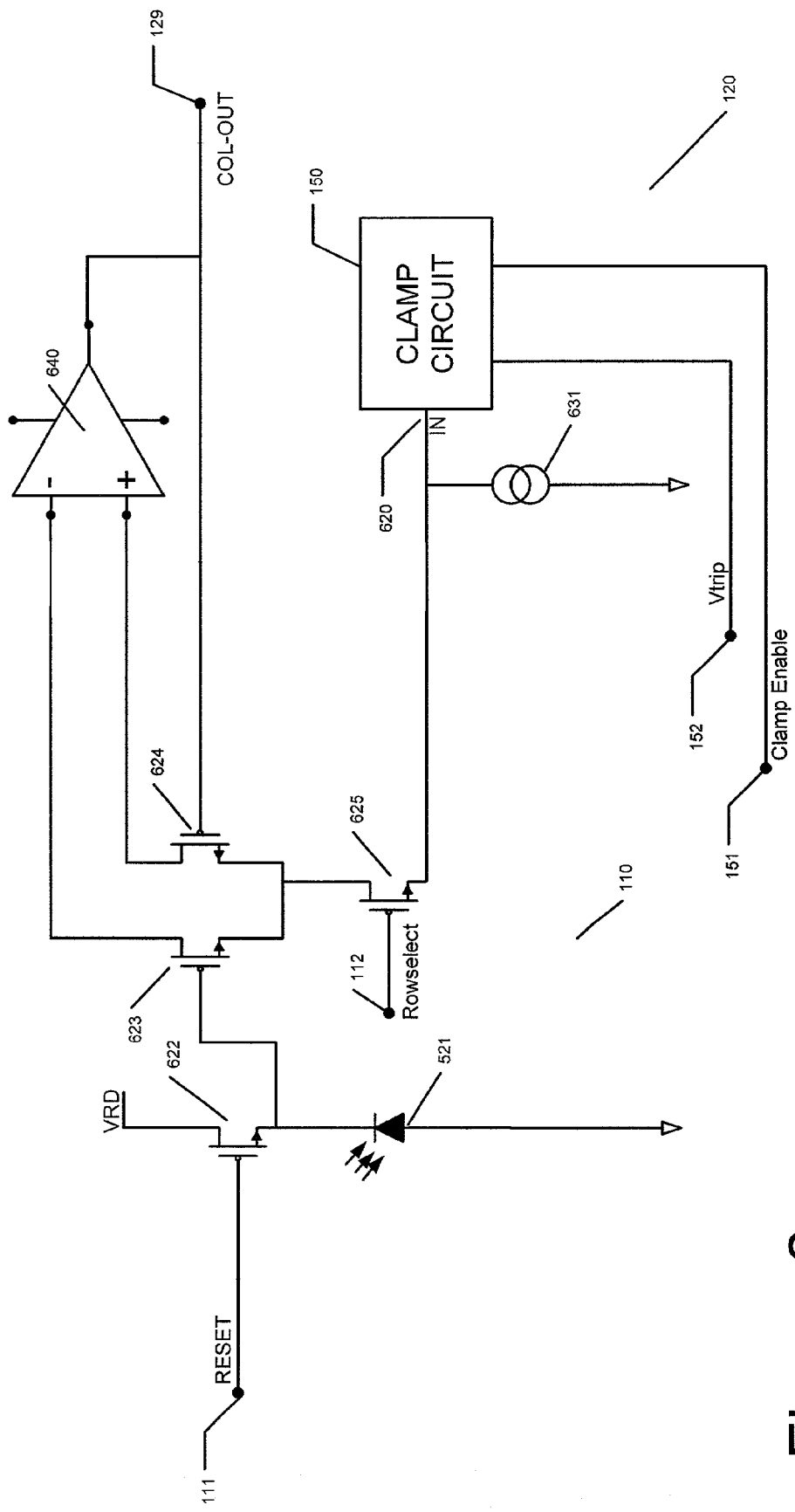
FIG. 6 shows in part schematic, part block diagram, pixel cell and per-column circuits according to an alternative embodiment of the invention.

FIG. 6 shows in part schematic, part block diagram, pixel cell, and per-column circuits according to an alternative exemplary embodiment of the invention that utilizes a differential feedback amplifier. Pixel cell 110 and per-column circuit 120 are shown. The circuit comprises photo-detector 521, transistors 622, 623, 624, and 625, current source 631, differential feedback amplifier 640 and clamp circuit 150, having input port IN 620. Differential feedback amplifier is used as a column buffer amplifier in the exemplary embodiment. Other forms of column buffer amplifier may be used within the general scope of the invention, for example, a single-ended amplifier and/or a source follower could be used to produce amplified signals. As a further example, portions of the column buffer amplifier functions may be distributed among pixel cells 110.

Figure 7:
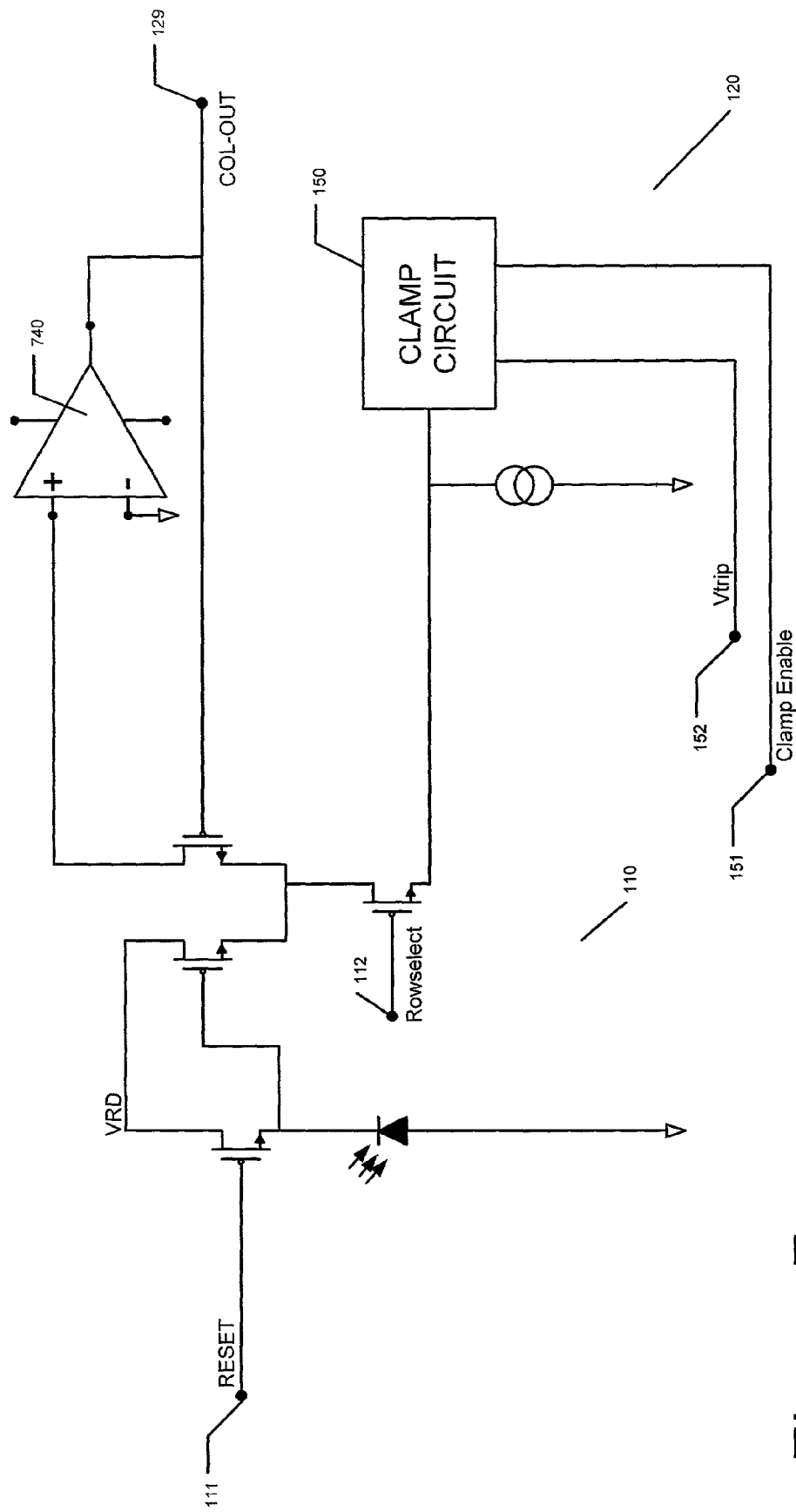
FIG. 7 shows in part schematic, part block diagram, pixel cell and per-column circuits according to another alternative embodiment of the invention.

FIG. 7 shows in part schematic, part block diagram, pixel cell, and per-column circuits, according to another exemplary alternative embodiment of the invention that utilizes a single-ended feedback amplifier 740.

Figure 8:
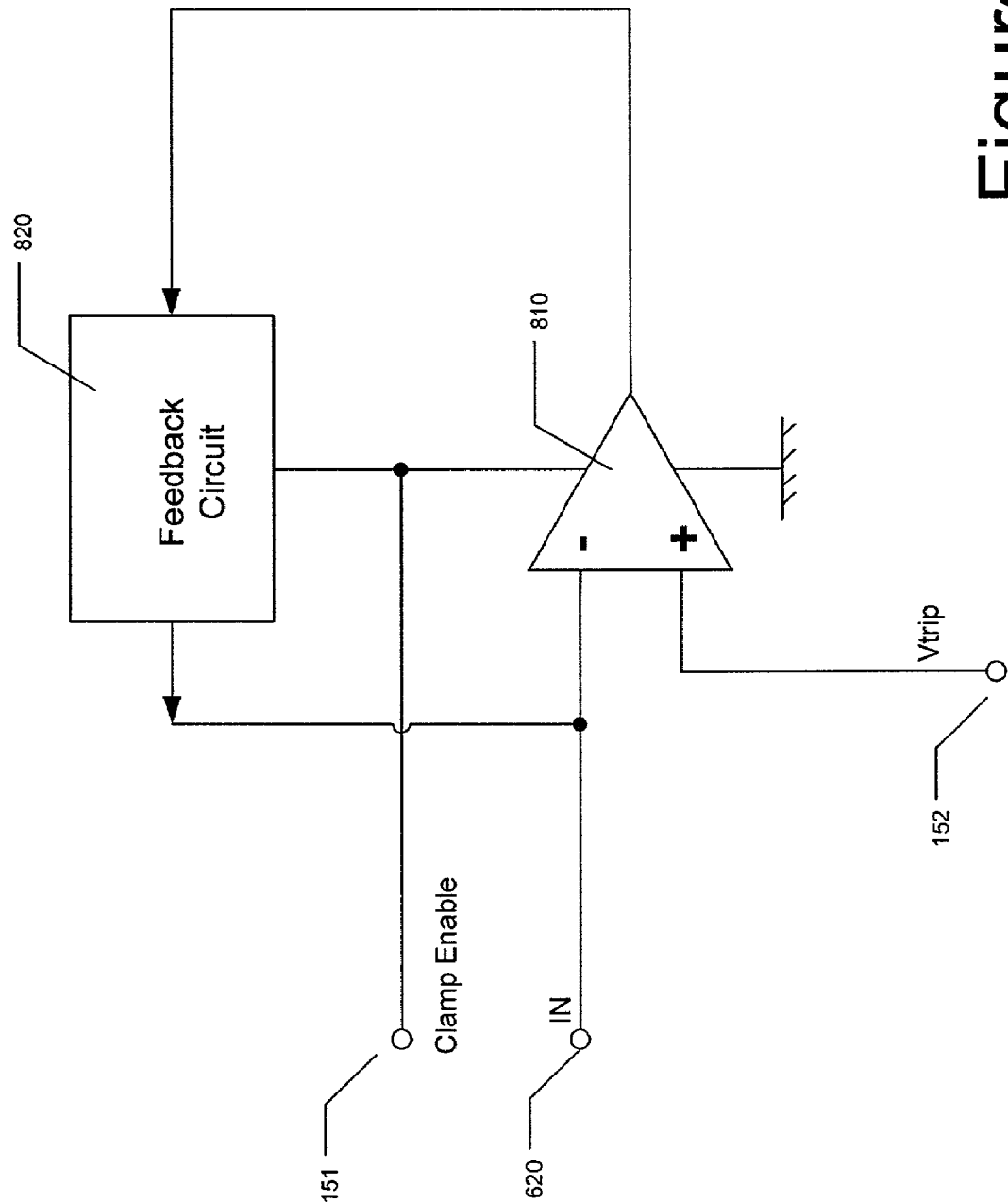
FIG. 8 shows in part schematic, part block diagram, an exemplary clamp circuit according to an embodiment of the invention.

FIG. 8 shows in part schematic, part block diagram, an exemplary clamp circuit 150 according to an embodiment of the invention. Amplifier 810 and feedback circuit 820 form a feedback loop that clamps the IN signal to Vtrip when the clamp signal is active.

Figure 9A:
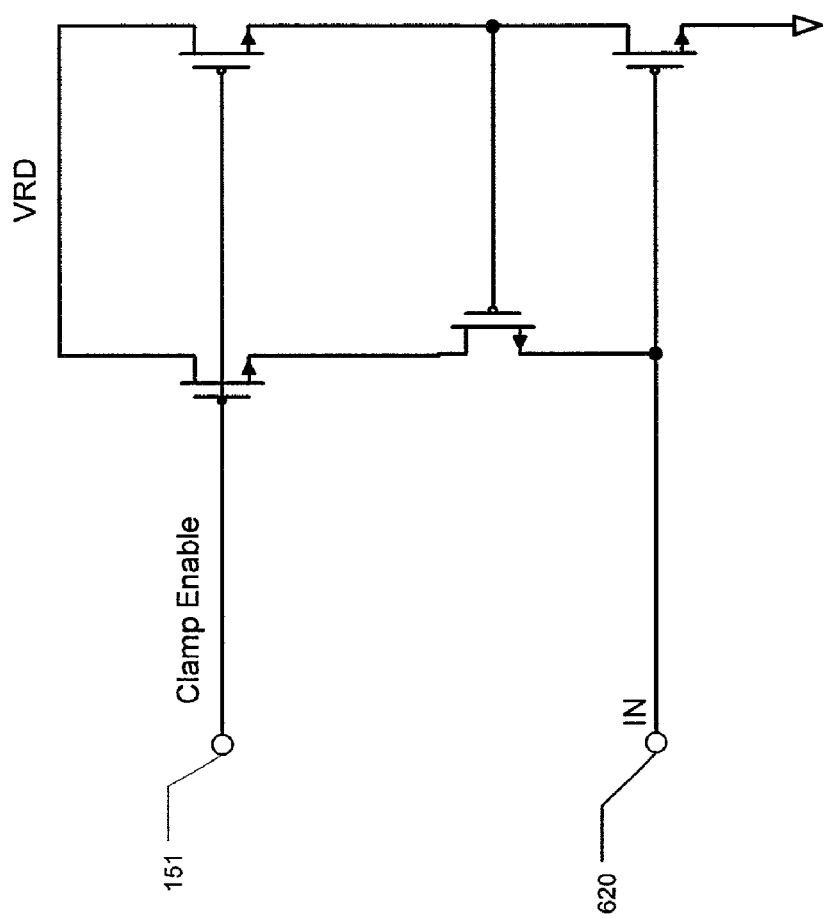
FIGS. 9A, 9B, 9C and 9D show in part schematic, part block diagram, an exemplary clamp circuit according to further exemplary embodiments of the invention.
Figure 9B:
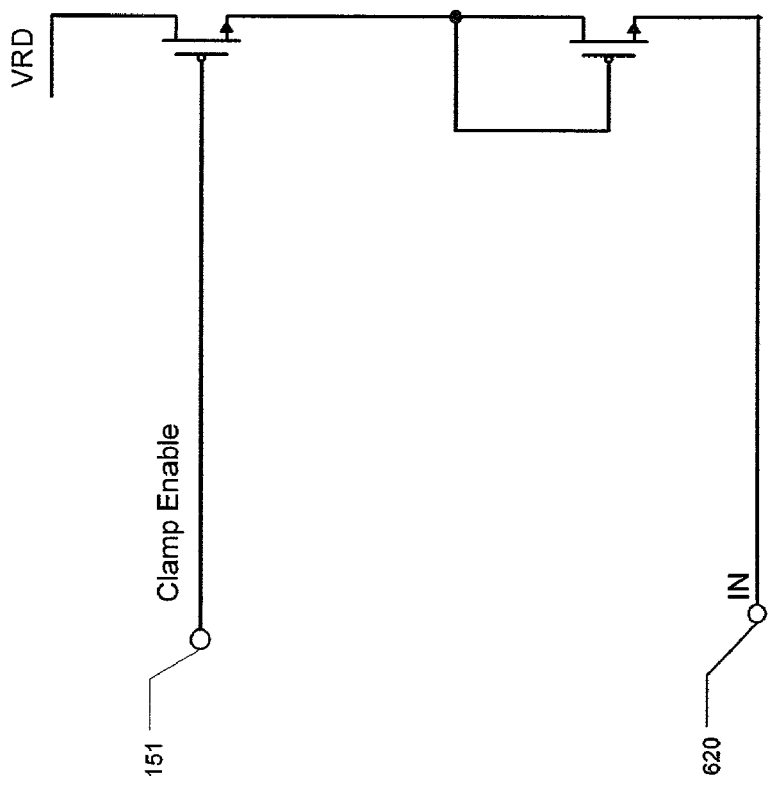
Figure 9C:
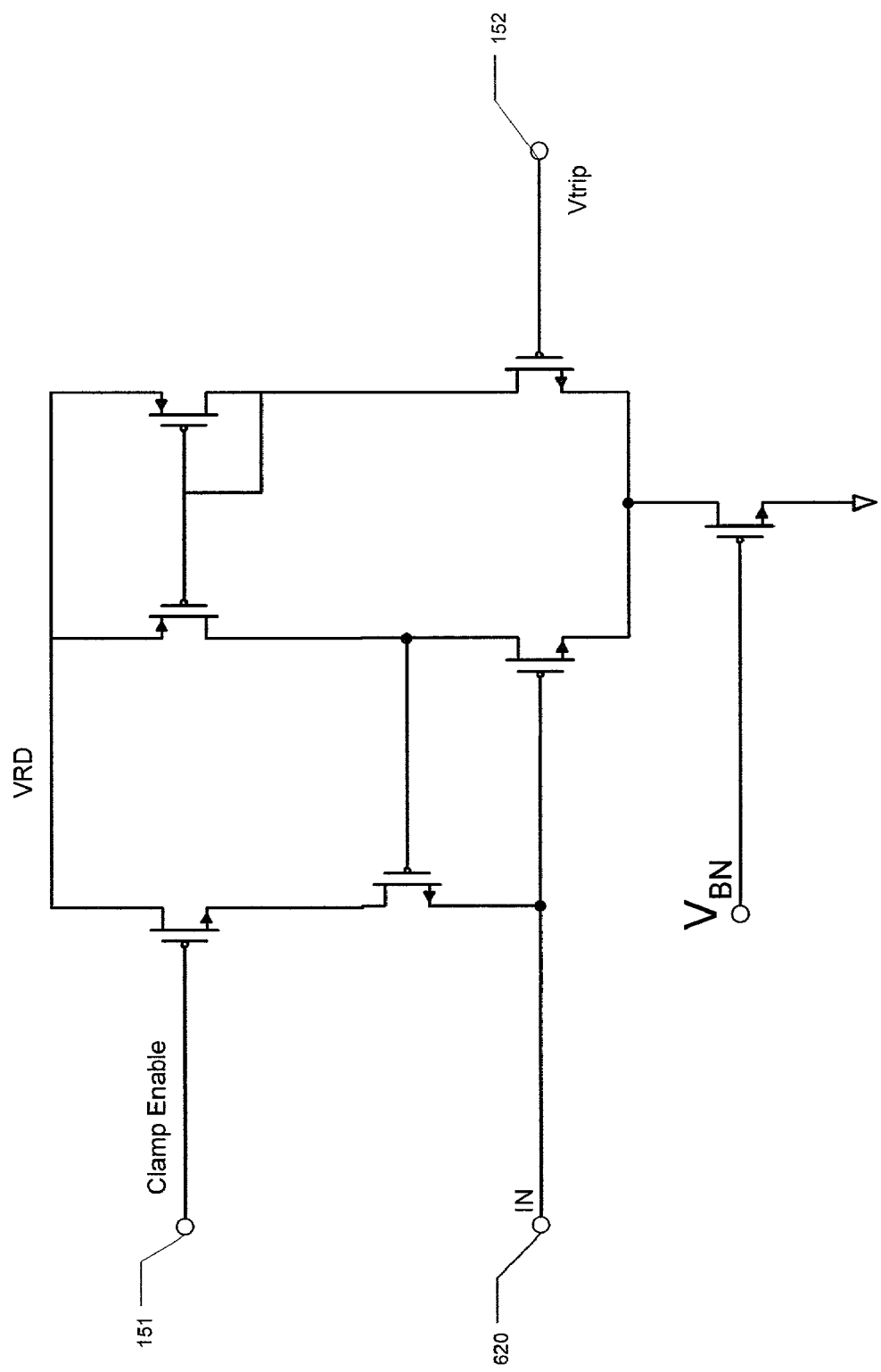
Figure 9D:
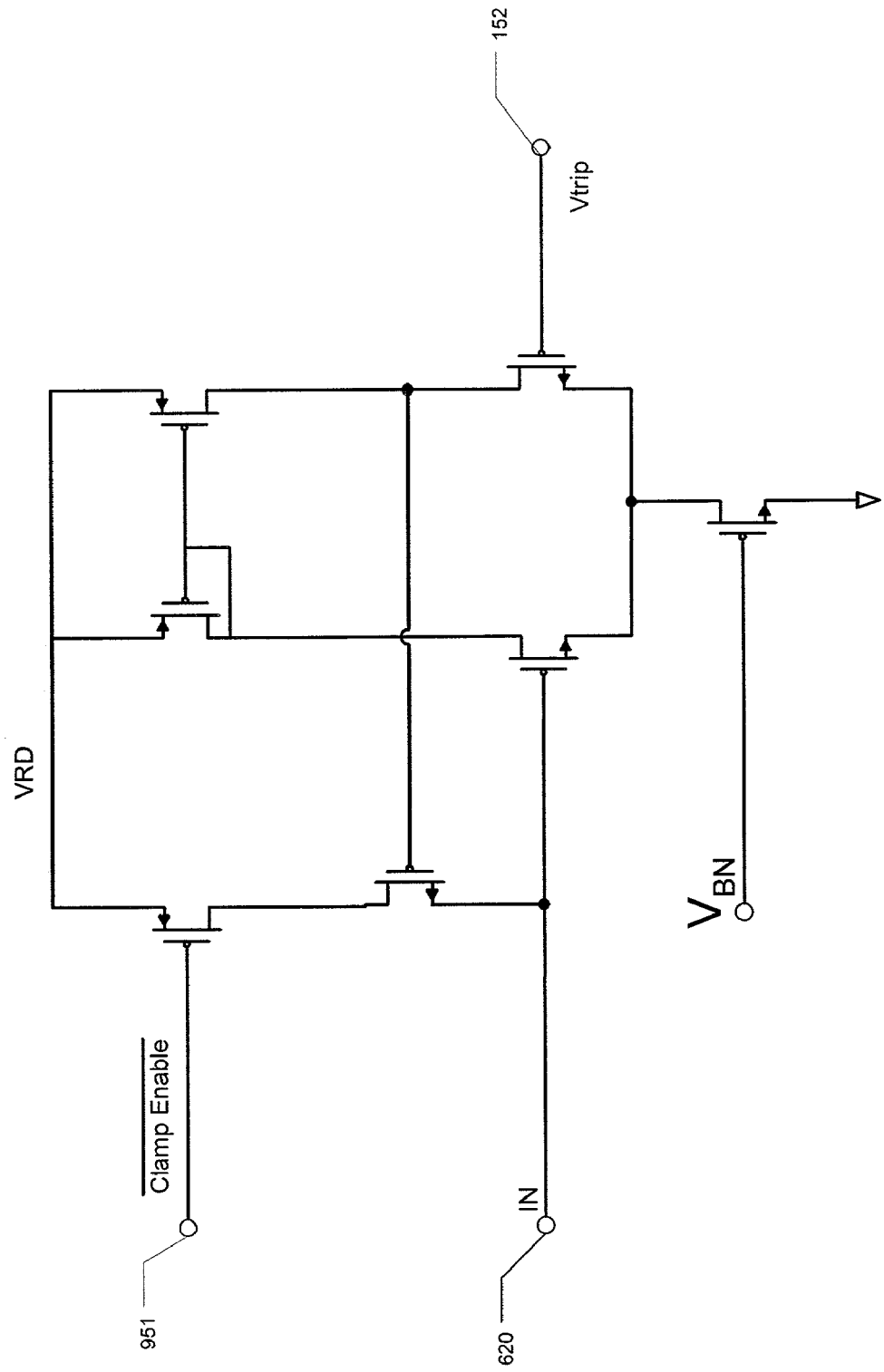

FIGS. 9A, 9B, 9C, and 9D show in part schematic, part block diagram, an exemplary clamp circuit according to further exemplary embodiments of the invention. In FIGS. 9A and 9B, the clamp enable signal 151 has two functions. Firstly the clamp enable signal enables the clamp circuit. Secondly the clamp enable signal establishes the level of Vtrip, referenced to VRD. In these cases the clamp enable signal is a threshold-passed signal, that is, it becomes asserted when the IN signal 620 passes a threshold that corresponds to detection of an over-saturation condition in a pixel cell. In FIG. 9C a separate Vtrip is used in conjunction with a gain amplifier to more accurately clamp the IN signal to the Vtrip level. In FIG. 9C, port $V_{BN}$ receives as bias voltage for bias current control. In FIG. 9D, the signal Not-Clamp-Enable 951 is a negative logic version of the signal clamp enable 151 in the earlier figures.

Figure 10:
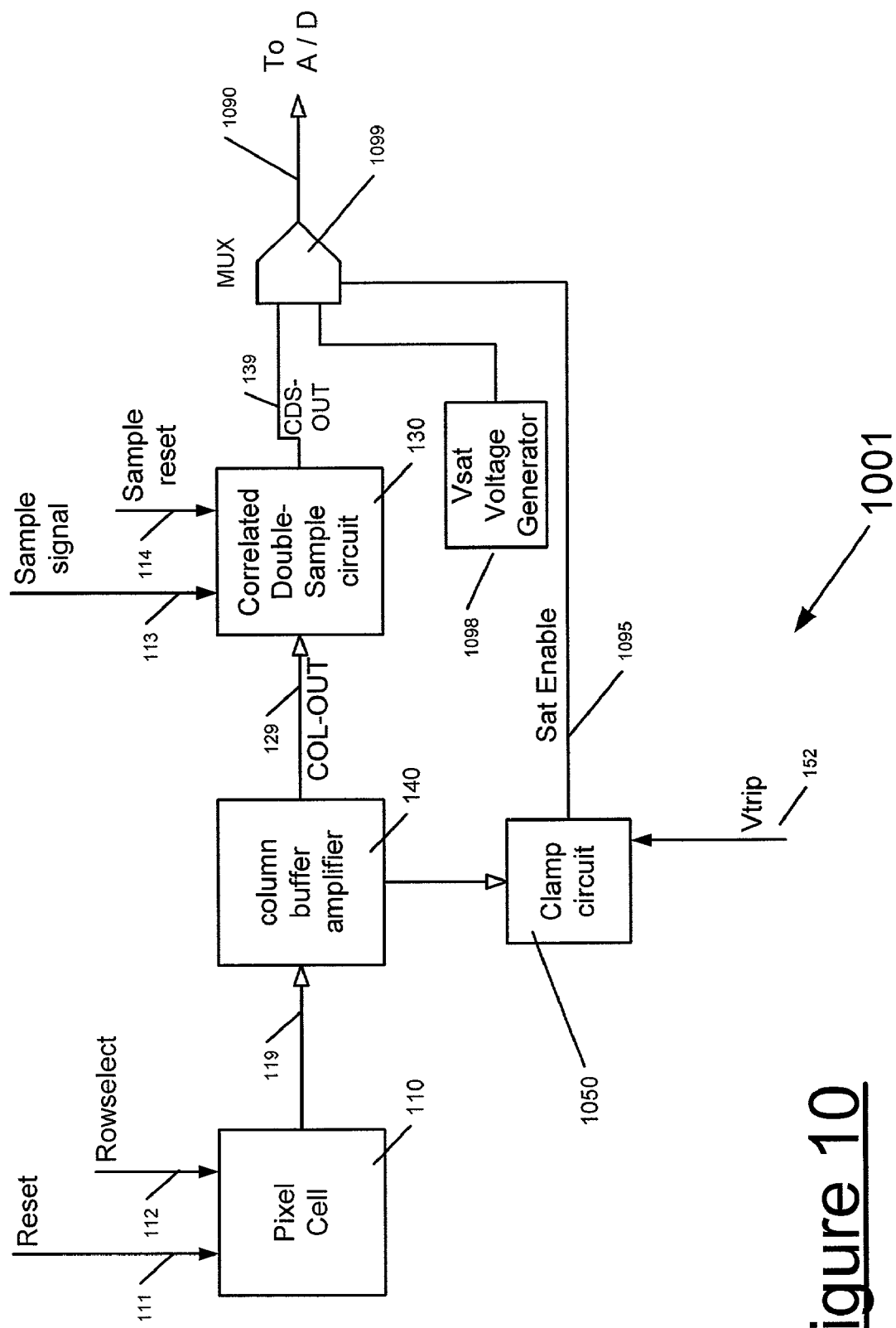
FIG. 10 is a block diagram of image sensor circuitry according to an alternative embodiment of the invention.

FIG. 10 is a block diagram of image sensor circuitry 1001 according to an alternative embodiment of the invention. As contrasted with the block diagram of FIG. 1, clamp circuit 1050 monitors output from the column buffer amplifier 140 but its clamp action is to impress a voltage Sat Enable 1095 upon the MUX (multiplexer) 1099 during conditions of over saturation. The MUX then selects between two input signals, one of which goes forward as a signal 1090 to an A/D (analog to digital converter—not shown in FIG. 10). The MUX receives the CDS-OUT signal 139 and a Vsat voltage corresponding to saturated light conditions from the Vsat voltage generator 1098. It is obvious to persons of ordinary skill in the art to provide a revised clamp circuit and a voltage generator. Similar alternative and equivalent embodiments within the general scope of the invention will be apparent to persons of ordinary skill in the art.

Figure 11:
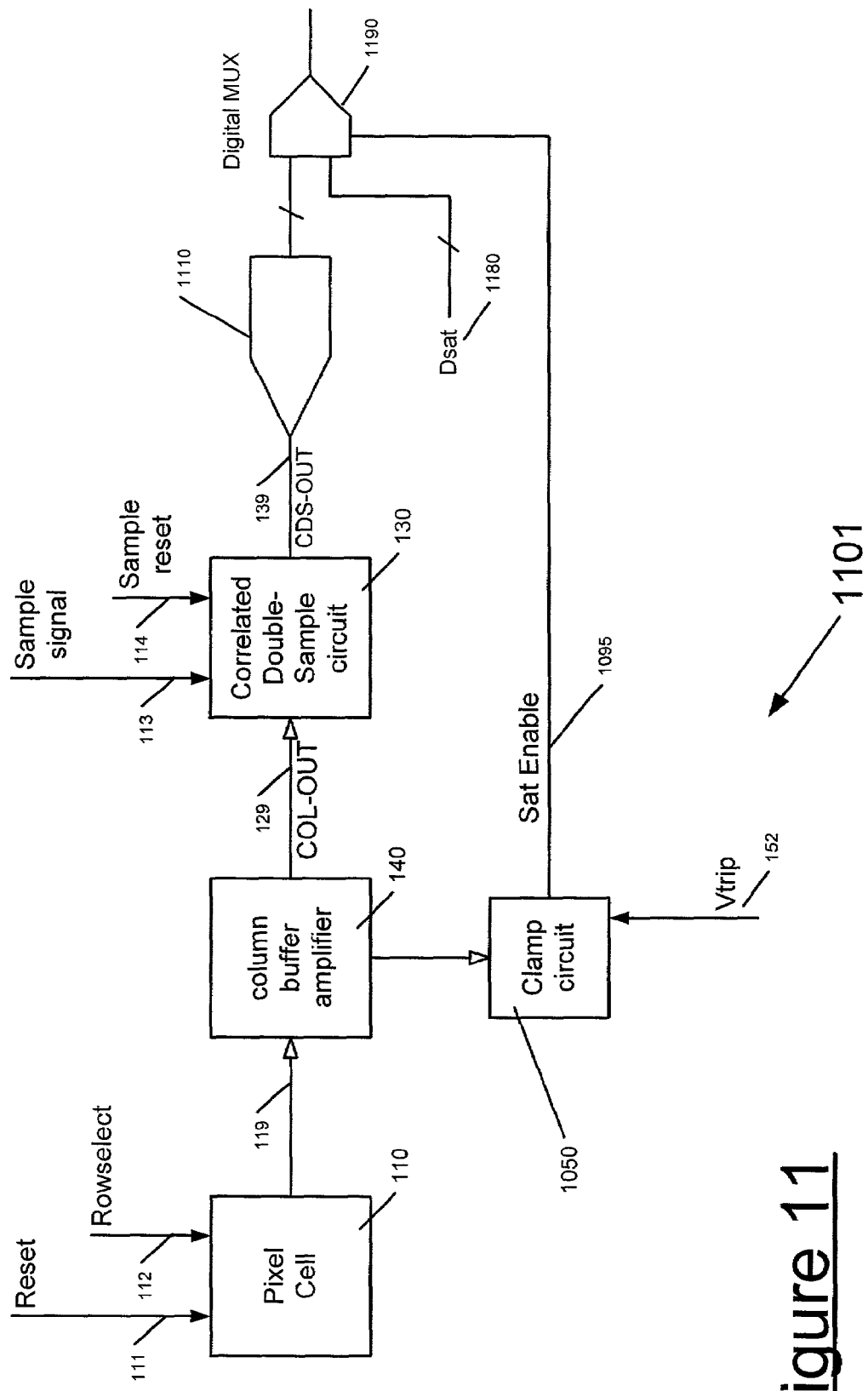
FIG. 11 is a block diagram of image sensor circuitry according to a further alternative embodiment of the invention.

One such similar or equivalent embodiment of the invention is shown in FIG. 11 which shows a block diagram of image sensor circuitry 1101 according to an alternative embodiment of the invention. As contrasted with the block diagram of FIG. 10, an A/D 1110 is shown and a digital MUX 1190. Sat Enable 1095 controls the digital MUX 1190 which selects between multi-bit signals from the A/D 1110 and from a digital value reference Dsat 1180. Such components and their usage are well known to persons of ordinary skill in the art.

Embodiments of the invention as described herein have significant advantages over previously developed implementations. For example, previously developed embodiments of image sensors fail to adequately abate image inversion due to the reaction of some CDS circuits to over-saturation. Also with appropriate adjustments as are well-known in the art P-well or N-well common industry processes may be used. P-channel devices and n-channel devices may be interchanged with appropriate source-drain and polarity transpositions as is well known in the art. Many other embodiments are feasible within the general scope of the invention and will be apparent to those of ordinary skill in the relevant arts. Many other means of detecting the signal level slewing and falling too quickly are feasible within the general scope of the invention. For example, a differentiator coupled to a high pass filter could be used to detect the high frequency spike and hence spectral content associated with a very fast slew over a large potential difference.

The embodiments described above are exemplary rather than limiting and the bounds of the invention should be determined from the claims.

What is claimed is:

1. A method for image sensing comprising the acts of:
producing, from a photo detector, a plurality of detected electronic signals responsive to an optical image;
amplifying, with a column buffer amplifier, signals selected from the detected electronic signals to produce a plurality of amplified signals;
sampling, with a correlated double sampler, signals selected from the amplified signals to produce a plurality of sampled signals; and
clamping, by a clamp circuit, at least one signal selected from the sampled signals during a reset phase of the correlated double sampler in response to a detecting of at least one over-saturation condition, whereby image inversion is at least partially abated.

2. The method of claim 1 wherein
the photo detector comprises a photo diode.

3. The method of claim 1 wherein
the photo detector comprises a photo gate.

4. The method of claim 1 wherein the clamp circuit is implemented in a technology selected from a list consisting of N-well CMOS process technology and of P-well CMOS process technology.

5. The method of claim 1, wherein the clamp circuit limits a reset voltage.

6. In an image sensor that correlates a reset sample of a first signal during a first interval after reset of a photo detector for a pixel and a second sample of the first signal during a later interval in the same sampling cycle as the first interval to produce a luminance signal for said pixel, a method comprising:

detecting that the first signal is slewing excessively rapidly during the first interval; and in response to said detecting, limiting the value of the reset sample;

whereby the image sensor produces an output of improved accuracy by abating an error in the luminance signal for said pixel due to said excessively rapid slewing, wherein the error is an image inversion due to over-saturation.

7. The method of claim 6 wherein:
the detecting is responsive to the first signal reaching the bounds of a predetermined threshold.

8. A method of image sensing, comprising:

determining a reset sample of a first signal during a first interval after reset of a pixel in a photo detector;

determining a second sample of the first signal during a later interval in the same sampling cycle as the first interval;

correlating the reset sample and the second sample to produce a luminance signal for said pixel;

detecting that the first signal is slewing excessively rapidly during the first interval; and in response to said detecting, limiting the value of the reset sample, whereby image inversion is at least partially abated.

* * * * *

UNITED STATES PATENT AND TRADEMARK OFFICE
CERTIFICATE OF CORRECTION

PATENT NO. : 7,397,505 B2 Page 1 of 1
APPLICATION NO. : 10/053111
DATED : July 8, 2008
INVENTOR(S) : Brehmer et al.

It is certified that error appears in the above-identified patent and that said Letters Patent is hereby corrected as shown below:

Column 3, line 28, delete "an complete image" and insert --a complete image--.

Column 5, line 11, delete "to provide and output" and insert --to provide an output--.

Signed and Sealed this

Twenty-sixth Day of August, 2008

JON W. DUDAS
*Director of the United States Patent and Trademark Office*